(12) United States Patent
Miwa et al.

(10) Patent No.: US 12,485,824 B2
(45) Date of Patent: Dec. 2, 2025

(54) STEP APPARATUS FOR VEHICLE

(71) Applicant: AISIN CORPORATION, Kariya (JP)

(72) Inventors: Masashi Miwa, Fujisawa (JP); Atsushi Muramatsu, Fujisawa (JP); Natsuki Ito, Fujisawa (JP); Takahisa Kobayashi, Fujisawa (JP); Norio Kato, Fujisawa (JP); Kimihiro Kinoshita, Fujisawa (JP)

(73) Assignee: AISIN CORPORATION, Kariya (JP)

( * ) Notice: Subject to any disclaimer, the term of this patent is extended or adjusted under 35 U.S.C. 154(b) by 291 days.

(21) Appl. No.: 18/249,089

(22) PCT Filed: Nov. 9, 2021

(86) PCT No.: PCT/JP2021/041163
§ 371 (c)(1),
(2) Date: Apr. 14, 2023

(87) PCT Pub. No.: WO2022/102609
PCT Pub. Date: May 19, 2022

(65) Prior Publication Data
US 2023/0391264 A1    Dec. 7, 2023

(30) Foreign Application Priority Data

Nov. 12, 2020   (JP) .................... 2020-188533

(51) Int. Cl.
*B60R 3/02*    (2006.01)
(52) U.S. Cl.
CPC ..................... *B60R 3/02* (2013.01)
(58) Field of Classification Search
CPC ................... B60R 3/02; B60R 3/002
See application file for complete search history.

(56) References Cited

U.S. PATENT DOCUMENTS

| | | | | |
|---|---|---|---|---|
| 4,180,143 A | * | 12/1979 | Clugston | B60R 3/02 280/166 |
| 5,842,709 A | * | 12/1998 | Maccabee | B60R 3/02 182/127 |

(Continued)

FOREIGN PATENT DOCUMENTS

| | | | | |
|---|---|---|---|---|
| CN | 107021023 A | * | 8/2017 | |
| CN | 107226031 A | * | 10/2017 | B60R 3/02 |

(Continued)

OTHER PUBLICATIONS

CN-107021023-A (Year: 2025).*
International Search Report issued Feb. 1, 2022 in PCT/JP2021/041163 filed on Nov. 9, 2021, 2 pages.

*Primary Examiner* — James A Shriver, II
*Assistant Examiner* — Ian Bryce Shelton
(74) *Attorney, Agent, or Firm* — Oblon, McClelland, Maier & Neustadt, L.L.P.

(57) ABSTRACT

A step apparatus for a vehicle includes a base attached to an outer side of a vehicle body, an arm rotatably provided on the base, and a step supported by the arm and movable with respect to the base. The step apparatus for a vehicle is in, by rotation of the arm, a deployed state in which the step is to be used or a stowed state in which the step is stowed under the vehicle body. A first rotation axis of a base end of the arm and a second rotation axis of a tip end of the arm are inclined upward toward an outer side of a vehicle width direction in an attached state in which the step apparatus for a vehicle is attached to the vehicle body.

9 Claims, 8 Drawing Sheets

(56) References Cited

U.S. PATENT DOCUMENTS

| | | | | |
|---|---|---|---|---|
| 6,942,233 | B2* | 9/2005 | Leitner | B60R 3/02 280/727 |
| 8,070,173 | B2* | 12/2011 | Watson | B60R 3/02 280/166 |
| 10,040,396 | B2* | 8/2018 | Stickles | B60R 3/02 |
| 10,343,610 | B2* | 7/2019 | Long | B60R 3/002 |
| 10,449,905 | B2* | 10/2019 | Stickles | B60R 3/02 |
| 10,538,204 | B2* | 1/2020 | Long | B60R 3/002 |
| 10,649,483 | B2* | 5/2020 | Liu | G05G 1/40 |
| 10,676,033 | B1* | 6/2020 | Carr | B60R 3/02 |
| 11,186,226 | B2* | 11/2021 | Tok | B60R 3/002 |
| 2006/0125204 | A1* | 6/2006 | Leitner | B60R 3/02 280/166 |
| 2006/0163836 | A1* | 7/2006 | Kobayashi | B60R 3/02 280/166 |
| 2008/0042395 | A1* | 2/2008 | Watson | B60R 3/02 280/166 |
| 2009/0250896 | A1* | 10/2009 | Watson | B60R 3/02 280/166 |
| 2016/0280139 | A1* | 9/2016 | Stickles | B60R 3/02 |
| 2017/0036608 | A1* | 2/2017 | Du | B60R 3/02 |
| 2017/0174138 | A1* | 6/2017 | Fortin | B60R 3/02 |
| 2017/0341585 | A1* | 11/2017 | Stickles | B60R 3/02 |
| 2018/0001825 | A1* | 1/2018 | Long | B61D 23/025 |
| 2018/0257572 | A1* | 9/2018 | Du | B60R 3/002 |
| 2019/0084482 | A1* | 3/2019 | Long | B60R 3/002 |
| 2019/0294196 | A1* | 9/2019 | Liu | G05G 1/40 |
| 2020/0339039 | A1* | 10/2020 | Watson | B60R 3/002 |
| 2021/0188178 | A1* | 6/2021 | Tok | B60R 3/02 |

FOREIGN PATENT DOCUMENTS

| | | | | |
|---|---|---|---|---|
| CN | 108216046 | A | * 6/2018 | |
| CN | 108583446 | A | * 9/2018 | |
| CN | 108791086 | A | * 11/2018 | B60R 3/02 |
| CN | 108973868 | A | * 12/2018 | |
| CN | 108973869 | A | * 12/2018 | B60R 3/02 |
| CN | 109501679 | A | * 3/2019 | B60Q 3/217 |
| CN | 110077322 | A | * 8/2019 | |
| CN | 209454651 | U | * 10/2019 | B60R 3/007 |
| CN | 210258230 | U | * 4/2020 | B60R 3/007 |
| CN | 111114440 | A | * 5/2020 | B60R 3/02 |
| JP | 4-86551 | U | 7/1992 | |
| JP | 5-18994 | U | 3/1993 | |
| JP | 2004-175339 | A | 6/2004 | |
| JP | 2016188043 | A | * 11/2016 | B60R 3/02 |
| JP | 2020-32847 | A | 3/2020 | |
| JP | 2020032847 | A | * 3/2020 | |

* cited by examiner

STEP APPARATUS FOR VEHICLE

TECHNICAL FIELD

The present invention relates to a step apparatus for a vehicle.

BACKGROUND ART

PTL 1 discloses a step apparatus for a vehicle. In the step apparatus for a vehicle described in PTL 1, a mechanism that moves a step has a portion that moves in an up-down direction and a vehicle width direction in a range below a vehicle body.

CITATION LIST

Patent Literature

PTL 1: JP2020-32847A

SUMMARY OF INVENTION

Technical Problem

However, since an obstacle for traveling is placed on a road or there is a step on the road, it is preferable that a portion disposed under the vehicle body is small in the vehicle width direction and the up-down direction.

Solution to Problem

In order to achieve the above object, a step apparatus for a vehicle according to an aspect of the invention includes: a base attached to an outer side of a vehicle body; an arm rotatably provided on the base; and a step supported by the arm and movable with respect to the base. The step apparatus for a vehicle is in, by rotation of the arm, a deployed state in which the step is to be used or a stowed state in which the step is stowed under the vehicle body. A first rotation axis of a base end of the arm and a second rotation axis of a tip end of the arm are inclined upward toward an outer side of a vehicle width direction in an attached state in which the step apparatus for a vehicle is attached to the vehicle body.

DESCRIPTION OF EMBODIMENTS

A step apparatus for a vehicle will be described with reference to FIGS. 1 to 13. It should be understood that the description "at least one of A and B" in the present specification means "only A, only B, or both A and B". In the present embodiment, a front-rear direction of a step apparatus 1 for a vehicle coincides with a front-rear direction of a vehicle 2 in a state in which the step apparatus 1 for a vehicle is attached to the vehicle 2. An up-down direction DZ of the step apparatus 1 for a vehicle coincides with a vertical direction in a state in which the step apparatus 1 for a vehicle is attached to the vehicle 2. A vehicle width direction DX of the step apparatus 1 for a vehicle coincides with a width direction of the vehicle 2 in an attached state in which the step apparatus 1 for a vehicle is attached to the vehicle 2.

Figure 1:
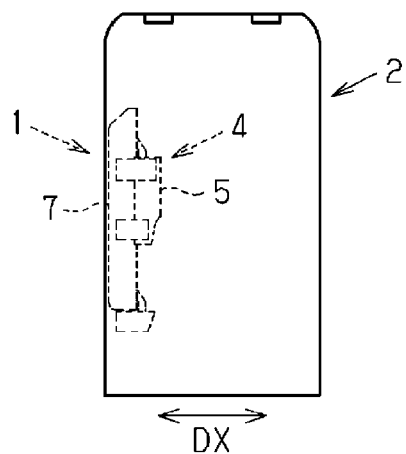
FIG. 1 is a plan view of a vehicle including a step apparatus for a vehicle.

As shown in FIG. 1, the step apparatus 1 for a vehicle is attached to the vehicle 2. For example, the step apparatus 1 for a vehicle is attached to a lower surface of a bottom plate of a vehicle body 3 (see FIG. 12). The step apparatus 1 for a vehicle is attached to the bottom plate of the vehicle body 3 in the vicinity of a vehicle entrance closed by a door. A step 7 of the step apparatus 1 for a vehicle is disposed below a lower end of the vehicle entrance for the purpose of being used as an auxiliary step for getting on and off when the step 7 is used. In one example, the step 7 of the step apparatus 1 for a vehicle is moved by a power from a motor 31.

Figure 2:
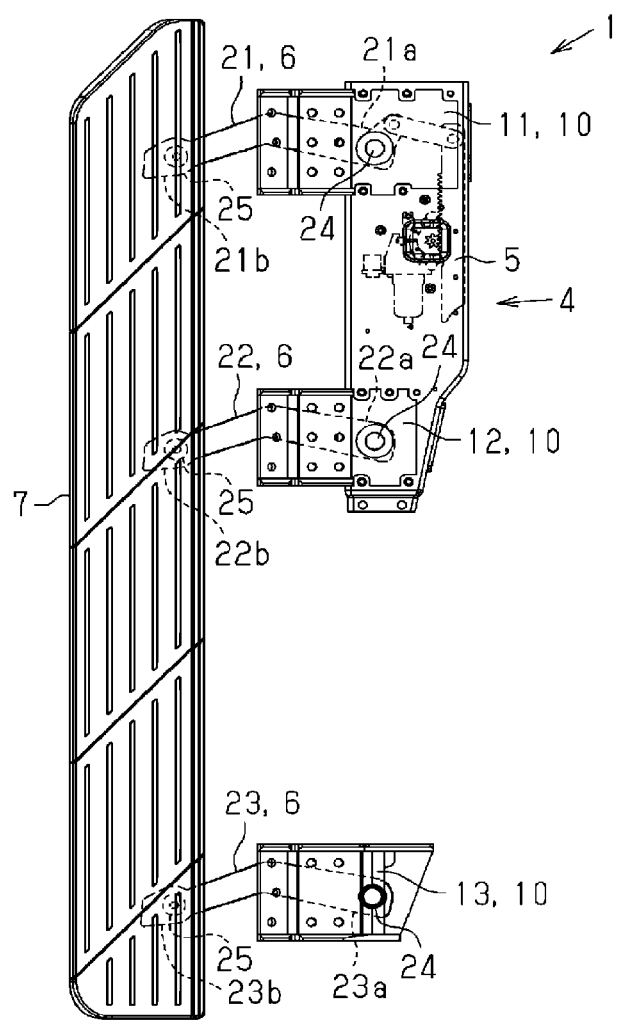
FIG. 2 is a diagram of the step apparatus for a vehicle as viewed from an axial direction along a first rotation axis.

As shown in FIG. 2, the step apparatus 1 for a vehicle includes a base 4 attached to an outer side of the vehicle body 3, arms 6 rotatably provided on the base 4, and the step 7. The step 7 is supported by the arms 6 and provided movably with respect to the base 4. That is, the step apparatus 1 for a vehicle is attached to the outer side of the vehicle body 3, not an inside of the vehicle body 3. The step apparatus 1 for a vehicle is in, by rotation of the arms 6, a deployed state in which the step 7 is to be used or a stowed state in which the step 7 is stowed under the vehicle body 3. In the deployed state, the step 7 is disposed at a deployed position. In the stowed state, the step 7 is disposed at a stowed position. The step 7 is moved between the deployed position and the stowed position by the rotation of the arms 6.

The step apparatus 1 for a vehicle shifts from the stowed state to the deployed state in response to a first command signal at the time of getting on and off. The first command signal may be a command signal based on a human operation, or may be a command signal based on an opening movement of a door.

The step apparatus 1 for a vehicle shifts from the deployed state to the stowed state in response to a second command signal. The second command signal may be a command signal based on the human operation, or may be a command signal based on a closing movement of the door.

Figure 3:
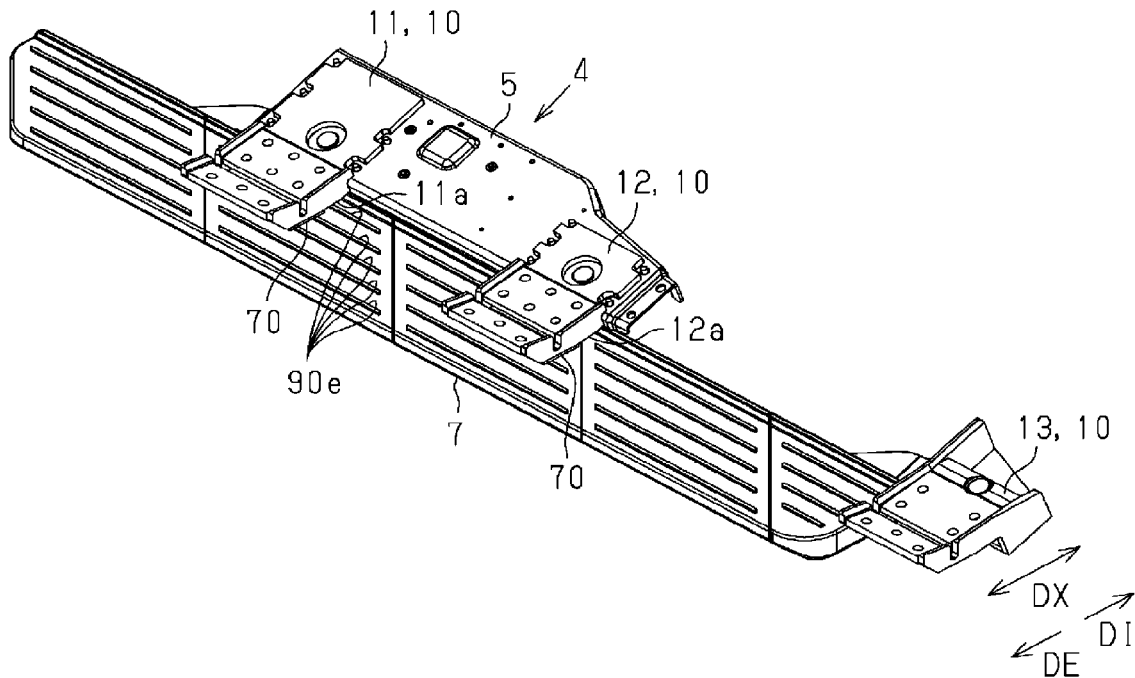
FIG. 3 is a perspective view of the step apparatus for a vehicle shown in FIG. 2 in which a step is disposed at a stowed position.

As shown in FIG. 3, in the stowed state of the step apparatus 1 for a vehicle, the step 7 is disposed at the stowed position near the base 4 by disposing a tip end of each arm 6 in front of a base end. In the attached state in which the step apparatus 1 for a vehicle is attached to the vehicle body 3, the stowed position of the step 7 is located at an inner side DI of the vehicle width direction with respect to the deployed position, and is located obliquely in front of the base 4.

Figure 4:
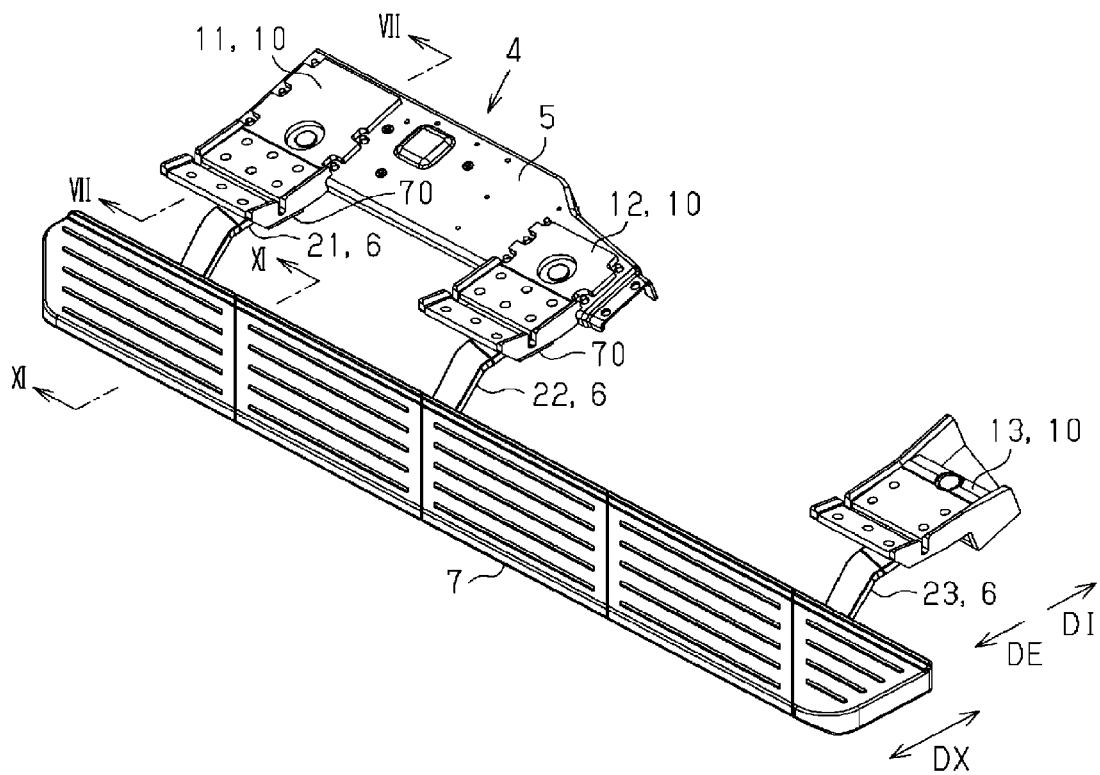
FIG. 4 is a perspective view of the step apparatus for a vehicle shown in FIG. 2 in which the step is disposed at a deployed position.

As shown in FIG. 4, in the deployed state of the step apparatus 1 for a vehicle, the step 7 is disposed at the deployed position away from the base 4 by the tip end of each arm 6 being disposed at a position away from the base end toward an outer side DE of the vehicle width direction. In the attached state in which the step apparatus 1 for a vehicle is attached to the vehicle body 3, the deployed position of the step 7 is located at a position separated from the base 4 by a predetermined distance in the vehicle width direction DX. In the deployed state of the step apparatus 1 for a vehicle, the arm 6 is inclined downward toward the outer side DE of the vehicle width direction (see FIG. 12). When the step 7 is disposed at the deployed position, at least a part of the step 7 is exposed from the vehicle body 3 in a plan view.

In the stowed state of the step apparatus 1 for a vehicle, the tip end of the arm 6 is disposed at a position higher than that of the tip end of the arm 6 in the deployed state, and is disposed in front of a base end of the arm 6. The position of step 7 in the stowed state is higher than the position of step 7 in the deployed state.

In the stowed state, the base end of the arm 6 is located above a lower end of the step 7. That is, in the stowed state, the lower end of the step 7 is located below the base end of the arm 6. In the stowed state, the arm 6 is slightly inclined downward toward the front.

As shown in FIG. 3, in the stowed state, the step 7 contacts with a lower portion of the base 4. At least one of the base 4 and the step 7 includes a contact portion 70. In the stowed state, the contact portion 70 is configured to contact with one of the base 4 and the step 7, which is different from the other one provided with the contact portion 70. In the present embodiment, the contact portion 70 is provided as a rubber plate on a lower surface of the base 4. The contact portion 70 contacts with an upper surface of the step 7. In one example, the contact portion 70 is provided on a lower surface 11a of a first bracket 11 and a lower surface 12a of a second bracket 12. As another embodiment, the contact portion 70 may be provided on the upper surface of the step 7, or may be provided on a lower surface of a bracket 10 as a protrusion protruding downward. When the contact portion 70 is provided on the upper surface of the step 7, the contact portion 70 may be configured as a protrusion protruding from an upper surface 7a of the step 7 as an anti-slip portion.

The contact portion 70 is made of an elastic member. For example, the elastic member includes rubber and plastic. The contact portion 70 may be made of a metal or plastic having elasticity. Examples of the metal or plastic having elasticity include a leaf spring.

As shown in FIG. 2, the step apparatus 1 for a vehicle includes a plurality of arms 6. The step 7 is supported by the plurality of arms 6. The step apparatus 1 for a vehicle further includes a drive portion 8 that operates the arms 6. The step apparatus 1 for a vehicle includes a first arm 21, a second arm 22, and a third arm 23 as the arms 6.

The base 4 includes a base main body 5 and three brackets 10. The base 4 is configured to extend in the front-rear direction of the vehicle 2 in the attached state in which the step apparatus 1 for a vehicle is attached to the vehicle body 3. In the present embodiment, the three brackets 10 are referred to as a first bracket 11, a second bracket 12, and a third bracket 13 in this order from the front. The drive portion 8, the first arm 21, and the second arm 22 are attached to the base main body 5. The base main body 5 is attached to the vehicle body 3 via the first bracket 11 and the second bracket 12. The third bracket 13 is attached to the vehicle body 3 independently of the first bracket 11 and the second bracket 12. The third arm 23 is attached to the third bracket 13. The third bracket 13 is attached to the vehicle body 3.

The base end of each arm 6 is rotatably attached to the base 4. First rotation axes CA of the base ends of the arms 6 are parallel to each other. The tip end of each arm 6 is rotatably attached to the step 7. Second rotation axes CB of the tip ends of the arms 6 are parallel to each other. Further, the second rotation axis CB of the tip end of each arm 6 is parallel to the first rotation axis CA of the base end of each arm 6.

The first arm 21, the second arm 22, and the third arm 23 are arranged in an order of the first arm 21, the second arm 22, and the third arm 23 from the front. A length of the first arm 21, a length of the second arm 22, and a length of the third arm 23 are all the same. A length of the arm 6 is defined as a distance between the first rotation axis CA of the base end of the arm 6 and the second rotation axis CB of the tip end of the arm 6.

A base end 21a of the first arm 21 is provided with a first shaft portion 24. The base end 21a of the first arm 21 is attached to the base 4 via the first shaft portion 24. A tip end 21b of the first arm 21 is attached to the step 7 via a second shaft portion 25.

A base end 22a of the second arm 22 is provided with the first shaft portion 24. The base end 22a of the second arm 22 is attached to the base 4 via the first shaft portion 24. A tip end 22b of the second arm 22 is attached to the step 7 via the second shaft portion 25.

A base end 23a of the third arm 23 is provided with the first shaft portion 24. The base end 23a of the third arm 23 is attached to the base 4 via the first shaft portion 24. A tip end 23b of the third arm 23 is attached to the step 7 via the second shaft portion 25.

The first arm 21, the second arm 22, and the third arm 23 are disposed at the same position in the vehicle width direction DX. Specifically, the first shaft portion 24 of the first arm 21, the first shaft portion 24 of the second arm 22, and the first shaft portion 24 of the third arm 23 are disposed at the same position in the vehicle width direction DX. The second shaft portion 25 of the first arm 21, the second shaft portion 25 of the second arm 22, and the second shaft portion 25 of the third arm 23 are disposed at the same position in the vehicle width direction DX.

The second shaft portion 25 of the first arm 21, the second shaft portion 25 of the second arm 22, and the second shaft portion 25 of the third arm 23 are disposed at the same height in the up-down direction DZ. The first shaft portion 24 of the first arm 21, the first shaft portion 24 of the second arm 22, and the first shaft portion 24 of the third arm 23 move in accordance with movement of the step 7 in a state in which a positional relation therebetween in the up-down direction DZ is maintained.

Figure 5:
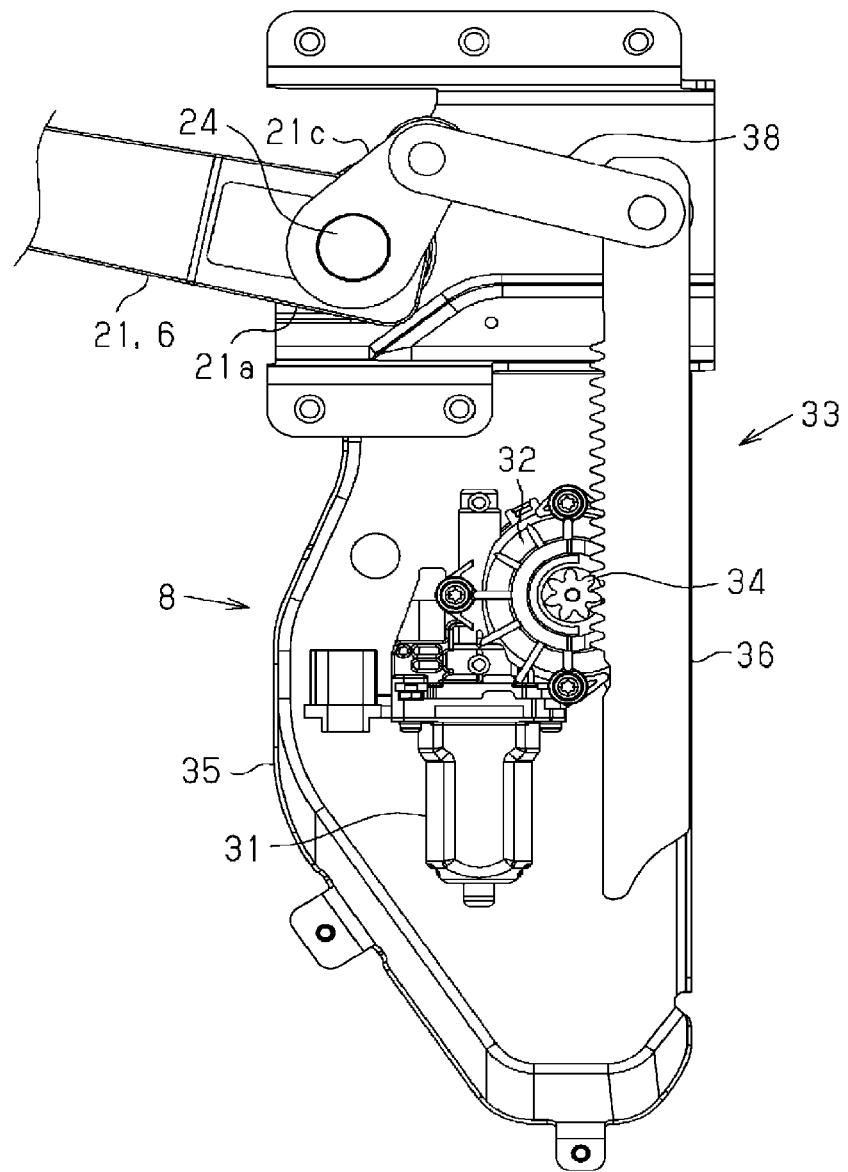
FIG. 5 is a plan view of a drive portion.

As shown in FIG. 5, the drive portion 8 includes the motor 31, a speed reduction portion 32, a power transmission portion 33, and a motor cover 35. The drive portion 8 rotates at least one arm 6. In the present embodiment, the drive portion 8 rotates the first arm 21.

The motor 31 is attached to the base main body 5 via a motor support member. The motor cover 35 accommodates the motor 31, the speed reduction portion 32, and the power transmission portion 33. The speed reduction portion 32 includes a speed reduction gear (not shown) that reduces a rotational speed of an output shaft of the motor 31, and a pinion gear 34 that rotates based on rotation of the speed reduction gear. The pinion gear 34 meshes with a rack 36 of the power transmission portion 33.

The power transmission portion 33 will be described with reference to FIG. 5.

The power transmission portion 33 includes the rack 36 reciprocally supported by the base 4, and a coupling component 38. The coupling component 38 couples an end portion of the rack 36 and a protruding portion 21c protruding from the base end 21a of the first arm 21. The protruding portion 21c protrudes from the base end 21a of the first arm 21 in a radial direction with respect to the first rotation axis CA of the first shaft portion 24. The protruding portion 21c is fixed to the base end 21a of the first arm 21. One end portion of the coupling component 38 is rotatably attached to the end portion of the rack 36, and the other end portion of the coupling component 38 is rotatably attached to the protruding portion 21c of the first arm 21.

The rack 36 is moved by a rotational power of the motor 31. The rotational power of the motor 31 is transmitted to the pinion gear 34. The rack 36 is moved by rotation of the pinion gear 34, and the first arm 21 coupled to the rack 36 by the coupling component 38 is pivoted by the movement of the rack 36. The step 7 is moved by pivoting the first arm 21. The second arm 22 and the third arm 23 are pivoted so as to follow the movement of the step 7. In short, the first arm 21 is pivoted by the rotational power of the motor 31, and the step 7 is moved by the pivoting of the first arm 21.

A structure of the first shaft portion 24 of the first arm 21 will be described with reference to FIGS. 6 and 7.

The first shaft portion 24 is supported by the base main body 5 and a shaft support member 60. The base 4 has a portion 5a orthogonal to the first rotation axis CA in the base main body 5. The shaft support member 60 has a portion 61a orthogonal to the first rotation axis CA on a receiving portion 61. The first shaft portion 24 is supported by the portion 5a orthogonal to the first rotation axis CA in the base 4 and the portion 61a orthogonal to the first rotation axis CA in the shaft support member 60. In the base 4 and the shaft support member 60, surfaces along the portions 5a and 61a orthogonal to the first rotation axis CA are inclined toward a lower side DD toward the outer side DE of the vehicle width direction in the attached state of the step apparatus 1 for a vehicle.

The first shaft portion 24 includes a cylindrical body 51 fixed to the first arm 21, a shaft body 52 inserted into the cylindrical body 51, and bearings 53 disposed between the shaft body 52 and the cylindrical body 51.

The shaft support member 60 is attached to the base main body 5. The shaft support member 60 includes the receiving portion 61 that receives a lower end portion of the first shaft portion 24, and a pair of side portions 62 extending from the receiving portion 61. The side portions 62 are provided at both ends of the receiving portion 61. The side portions 62 each include an extension portion 62a extending toward the base main body 5, and a fixing portion 62b connected to the extension portion 62a and fixed to the base main body 5. The shaft support member 60 is attached to the base main body 5 such that the receiving portion 61 is parallel to the base main body 5.

Figure 6:
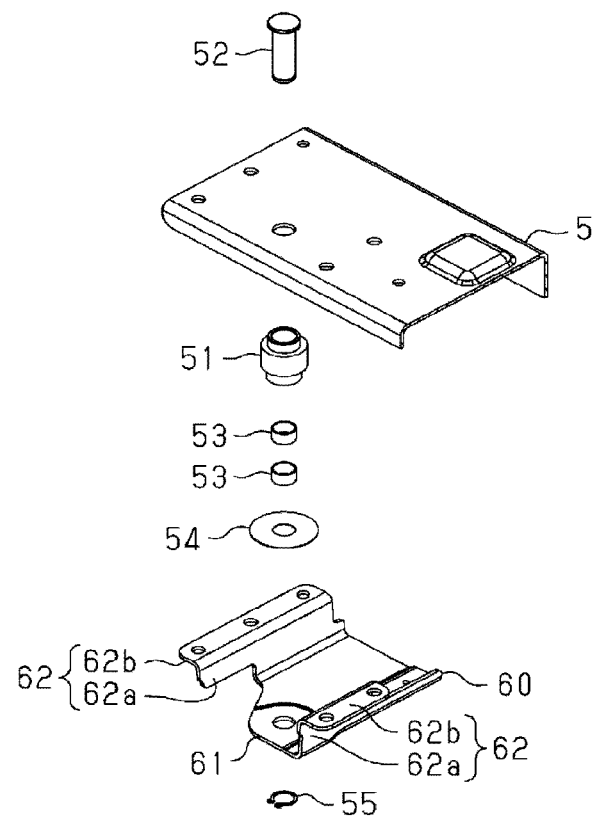
FIG. 6 is an exploded perspective view of a first shaft portion.
Figure 7:
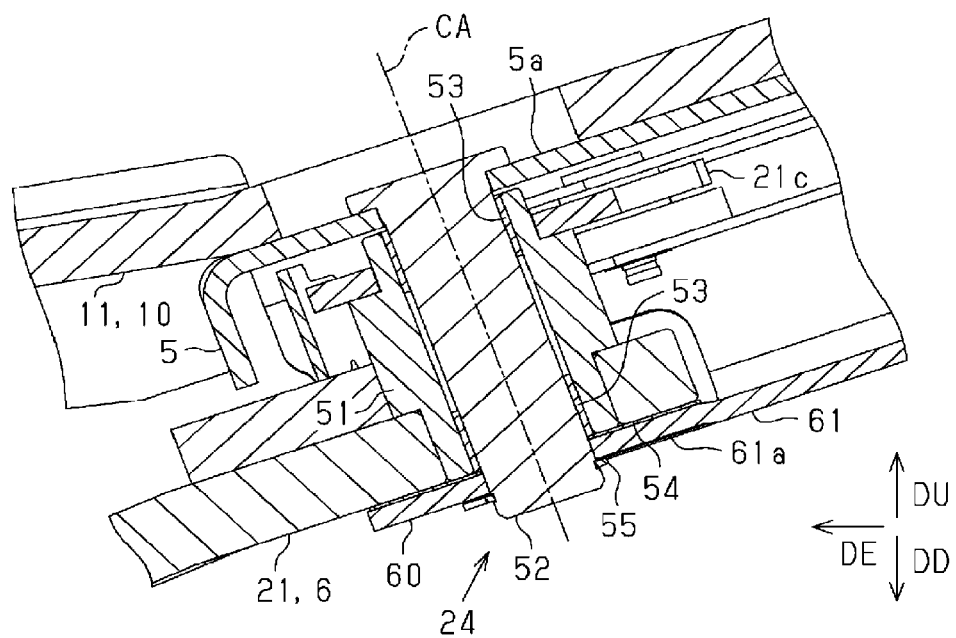
FIG. 7 is a cross-sectional view of the step apparatus for a vehicle taken along line VII-VII in FIG. 4.

As shown in FIG. 6, an upper end portion of the first shaft portion 24 is fixed to the base main body 5. The lower end portion of the first shaft portion 24 is fixed to the shaft support member by a fastener 55. The cylindrical body 51 and the shaft body 52 of the first shaft portion 24 are disposed between the pair of side portions 62 of the shaft support member 60. The base end 21a of the first arm 21 is fixed to the cylindrical body 51. The first arm 21 and the cylindrical body 51 rotate integrally with the shaft body 52. A washer 54 is disposed between an end surface of the cylindrical body 51 and the receiving portion 61 of the shaft support member 60.

The first rotation axis CA of the base end and the second rotation axis CB of the tip end of each arm 6 are inclined toward an upper side DU toward the outer side DE of the vehicle width direction in the attached state in which the step apparatus 1 for a vehicle is attached to the vehicle body 3. Specifically, in the attached state in which the step apparatus 1 for a vehicle is attached to the vehicle body 3, the first rotation axis CA and the second rotation axis CB are inclined toward the upper side DU toward the outer side DE of the vehicle width direction as viewed from the front. In the attached state in which the step apparatus 1 for a vehicle is attached to the vehicle body 3, the first rotation axis CA and the second rotation axis CB are not inclined as viewed from the side. That is, the first rotation axis CA and the second rotation axis CB are not inclined in the front-rear direction.

The base main body 5 is attached to the vehicle body 3 via the first bracket 11 and the second bracket 12 such that the first rotation axes CA of the first shaft portions 24 of the first arm 21 and the second arm 22 are inclined toward the upper side DU toward the outer side DE of the vehicle width direction. The third bracket 13 is directly attached to the vehicle body 3 such that the first rotation axis CA of the first shaft portion 24 of the third arm 23 is inclined toward the upper side DU toward the outer side DE of the vehicle width direction.

Figure 8:
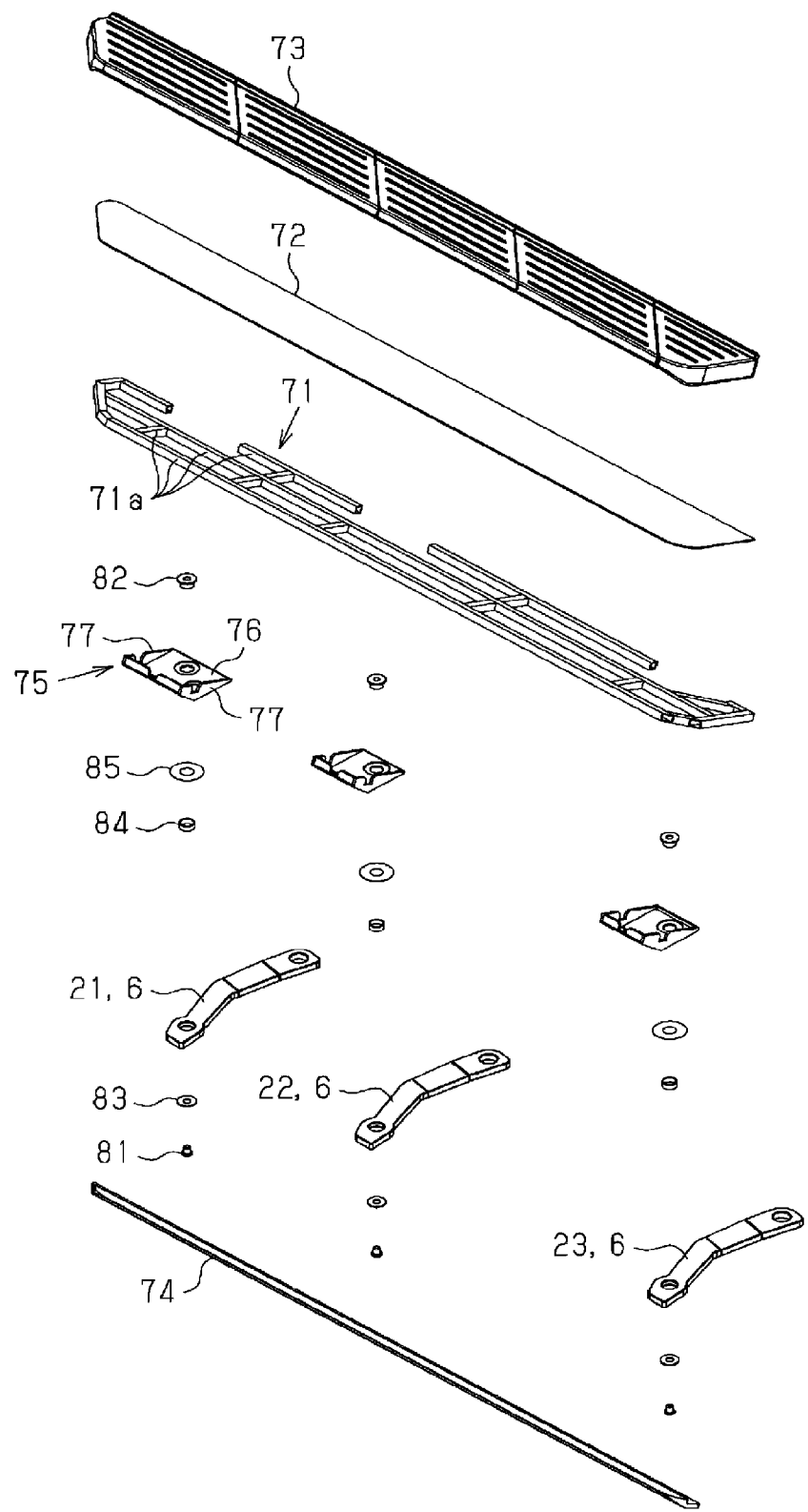
FIG. 8 is an exploded perspective view of the step.

The step 7 will be described with reference to FIGS. 8 to 10. A length of the step 7 is configured to be a length corresponding to a length of the vehicle entrance, for example. The step 7 includes a frame 71, a sheet 72 attached on the frame 71, a step cover 73, and a lower cover 74. The sheet 72 is formed of resin or metal. The frame 71 may be formed by a plurality of frame members 71a or may be formed of a metal plate. Examples of the frame members 71a include a prismatic pipe. The step cover 73 overlaps over the sheet 72. The step cover 73 is formed of resin or metal. The lower cover 74 is attached below the frame 71. In one example, the lower cover 74 is provided below the frame 71 and along an outer edge in the vehicle width direction DX. The lower cover 74 is formed of resin or metal.

Figure 9:
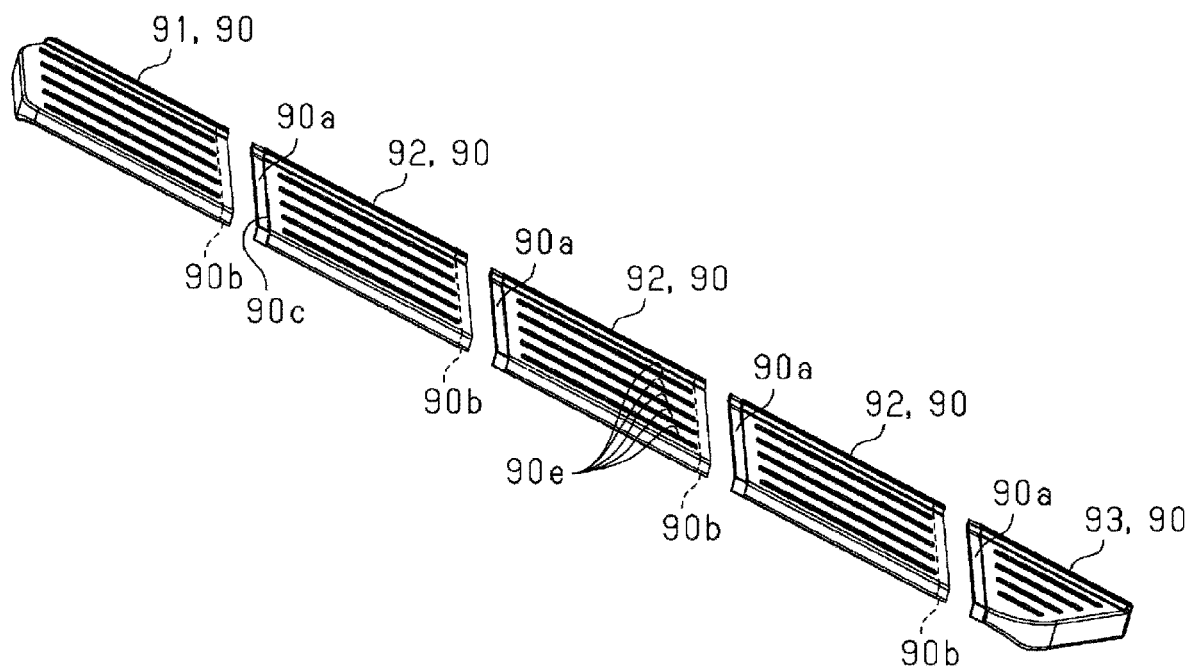
FIG. 9 is an exploded perspective view of a step cover.

As shown in FIG. 9, the step cover 73 may be constituted by a plurality of step cover constituting members 90. The plurality of step cover constituting members 90 are arranged in the front-rear direction and coupled to each other. One of two step cover constituting members 90 coupled to each other has a first coupling portion 90a, and the other has a second coupling portion overlapping over the first coupling portion 90a. The first coupling portion 90a is configured as a stepped portion having a stepped surface 90c extending from an upper surface to a back surface of the step cover constituting member 90.

Figure 10:
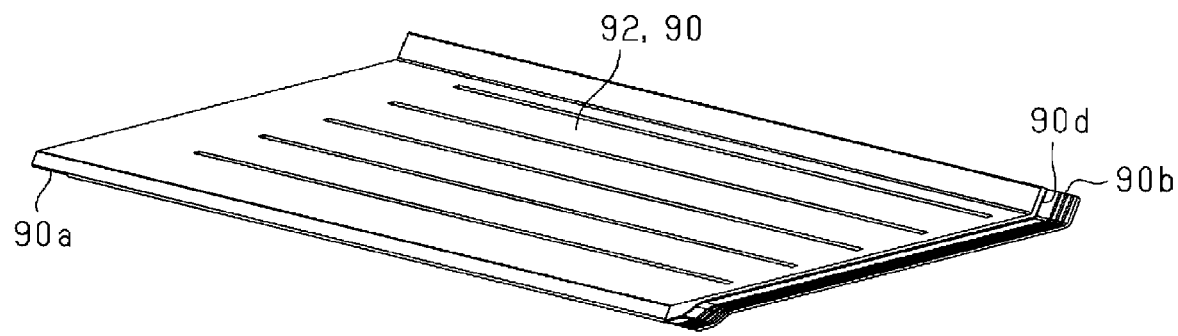
FIG. 10 is a perspective view of a second step cover constituting member shown in FIG. 9.

As shown in FIG. 10, the second coupling portion 90b is configured as a stepped portion having a stepped surface 90d extending from the back surface to the upper surface of the step cover constituting member 90.

The plurality of step cover constituting members 90 each have an anti-slip portion 90e. The anti-slip portion 90e is configured as a protrusion protruding from the upper surface of the step cover constituting member 90. In one example, the anti-slip portion 90e includes a through hole provided in the step cover constituting member 90 and a rubber member 90g fitted into the through hole 90f (see FIG. 11). The through hole 90f extends in a longitudinal direction of the step 7.

In one example, as shown in FIG. 9, the step cover 73 is constituted by five step cover constituting members 90. The step cover 73 includes a first step cover constituting member 91 disposed at a front portion of the step cover 73, second step cover constituting members 92 disposed at an intermediate portion of the step cover 73, and a third step cover constituting member 93 disposed at a rear portion of the step cover 73. The second coupling portion 90b is provided at a rear end of the first step cover constituting member 91. The first coupling portion 90a is provided at a front end of each second step cover constituting member 92, and the second coupling portion 90b is provided at a rear end of the second step cover constituting member 92. The first coupling portion 90a is provided at a front end of the third step cover constituting member 93. The second coupling portions 90b of the first step cover constituting member 91 and the second step cover constituting members 92 have the same shape. The first coupling portions 90a of the second step cover constituting members 92 and the third step cover constituting member 93 have the same shape. With this configuration, various combinations of the first step cover constituting member 91, the second step cover constituting members 92, and the third step cover constituting member 93 can be made, and a length of the step cover 73 can be easily changed. For example, the short step cover 73 can be constituted by the first step cover constituting member 91 and the third step cover constituting member 93 without the second step cover constituting members 92. In addition, the length of the step cover 73 can be easily changed by adjusting the number of the second step cover constituting members 92. The step cover 73 has a structure in which the length can be adjusted in this way, therefore in production of a plurality of types of step apparatus 1 for a vehicle in which the length of the step 7 is different from each other, parts of the step 7 can be shared, and production efficiency can be improved. In addition, a drainage groove is formed by providing a groove between the first coupling portion 90a and the second coupling portion 90b. The drainage groove can efficiently drain rainwater accumulated in the step 7.

Figure 11:
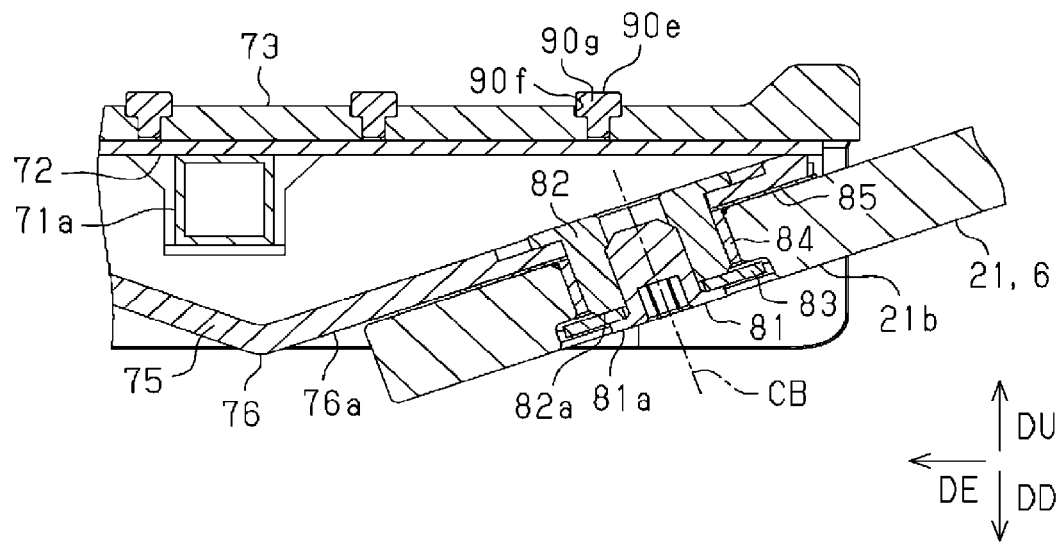
FIG. 11 is a cross-sectional view of the step apparatus for a vehicle taken along line XI-XI in FIG. 4.

An attachment structure of the tip end of the arm 6 will be described with reference to FIG. 11. FIG. 11 is a cross-sectional view of the step apparatus 1 for a vehicle taken along line XI-XI in FIG. 4.

The frame 71 of step 7 is provided with an attachment portion 75. The tip end 21b of the first arm 21 is rotatably attached to the attachment portion 75. The attachment portion 75 is attached to a lower portion of the frame 71.

The attachment portion 75 includes a support portion 76 supported by the arm 6 and two side portions 77 provided on the support portion 76. The support portion 76 has a support surface 76a supported by the arm 6. The support surface 76a contacts with a washer 85 disposed on an upper surface of the tip end of the arm 6. Alternatively, the support surface 76a may directly contact with the upper surface of the tip end of the arm 6.

The two side portions 77 are parts for fixing the support portion 76 to the frame 71. The two side portions 77 are provided on the support portion 76 at intervals in the longitudinal direction of the step 7. The side portions 77 may be formed integrally with the support portion 76.

The support surface 76a of the support portion 76 is orthogonal to the second rotation axis CB of the second shaft portion 25. In one example, when the step 7 is viewed along the longitudinal direction, the support surface 76a is inclined to extend toward the lower side DD while extending toward the outer side DE of the vehicle width direction. Further, the attachment portion 75 is configured such that the upper surface 7a of the step 7 is horizontal when the step 7 is disposed at a deployed position in the attached state in which the step apparatus 1 for a vehicle is attached to the vehicle body 3.

The attachment portion 75 is provided with the second shaft portion 25. The second shaft portion 25 includes a first pin 81 and a second pin 82 coupled to the first pin 81. The first pin 81 is coupled to the second pin 82 by being press-fitted into a hole of the second pin 82. The second pin 82 is fixed to the attachment portion 75 by being press-fitted into a hole of the support portion 76 of the attachment portion 75. A retaining plate 83 is provided between a lower end surface 82a of the second pin 82 and a flange 81a of the first pin 81. The retaining plate 83 is sandwiched between the lower end surface 82a of the second pin 82 and the flange 81a of the first pin 81. The retaining plate 83 prevents the tip end of the arm 6 from coming off the second shaft portion 25. The retaining plate 83 may be formed integrally with the flange 81a of the first pin 81.

A roller 84 is rotatably attached to the second shaft portion 25. The tip end 21b of the first arm 21 is attached to the second shaft portion 25 via the roller 84. Specifically, the roller 84 is accommodated in a through hole of the tip end 21b of the first arm 21. The second shaft portion is inserted into a hole of the roller 84.

In a state in which the tip end 21b of the first arm 21 is attached to the second shaft portion via the roller 84, the washer 85 is disposed between the upper surface of the tip end 21b of the first arm 21 and the support surface 76a of the attachment portion 75.

In the step 7, a structure of a portion where the tip end 22b of the second arm 22 is disposed has a structure that is similar to a structure of a portion where the tip end of the first arm 21 is disposed.

In the step 7, a structure of a portion where the tip end 23b of the third arm 23 is disposed has a structure that is similar to the structure of the portion where the tip end of the first arm 21 is disposed.

Operations of the present embodiment will be described with reference to FIGS. 12 and 13.

Figure 12:
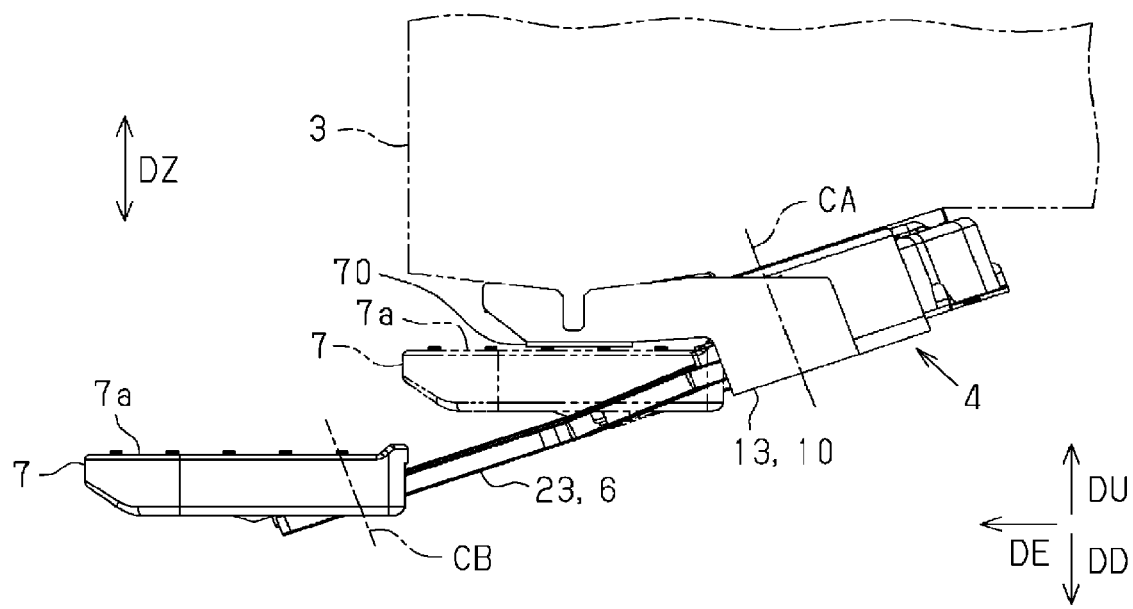
FIG. 12 is a rear view of the step apparatus for a vehicle shown in FIG. 2 in which the step is disposed at the deployed position.
Figure 13:
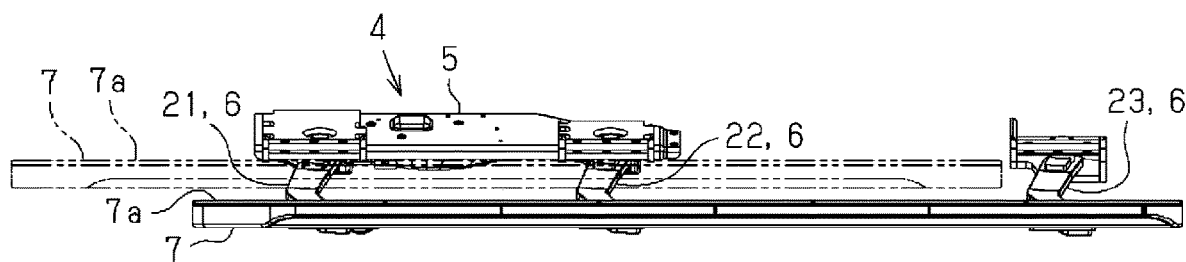
FIG. 13 is a side view of the step apparatus for a vehicle in which the step is disposed at the deployed position.

FIG. 12 is a rear view of the step apparatus 1 for a vehicle when the step 7 is disposed at the deployed position, and FIG. 13 is a side view of the step apparatus 1 for a vehicle when the step 7 is disposed at the deployed position. In FIGS. 12 and 13, a two-dot chain line indicates the step 7 in a stowed position.

The first rotation axis CA of the first shaft portion 24 of each arm 6 is inclined toward the upper side DU toward the outer side DE of the vehicle width direction. The first rotation axes CA of the first shaft portions 24 of the arms 6 are parallel to each other. With this configuration, by the rotation of each arm 6, the tip end of the arm 6 is moved toward the inner side DI of the vehicle width direction and forward from a lowest position while moving toward the upper side DU. By such a locus of the movement of the tip end of each arm 6, the step 7 can be moved toward the inner side DI of the vehicle width direction and forward from the lowest position while moving toward the upper side DU.

In the movement of the step 7, the base end of the arm 6 does not move. In addition, in the movement of step 7, the arm 6 rotates in a region of the outer side DE in the vehicle width direction with respect to the base end of the arm 6.

Accordingly, in the step apparatus 1 for a vehicle, a space below the vehicle body 3 is not used in the movement of the step 7. Accordingly, a portion disposed below the vehicle body 3 in the step apparatus 1 for a vehicle is smaller in the vehicle width direction DX and also smaller in the up-down direction DZ than that of a step apparatus for a vehicle of the related art in which a link mechanism is provided below the vehicle body 3.

The effects of the present embodiment will be described.

(1) In the step apparatus 1 for a vehicle, the first rotation axis CA of the base end of the arm 6 and the second rotation axis CB of the tip end of the arm 6 are inclined toward the upper side DU and toward the outer side DE of the vehicle width direction in the attached state in which the step apparatus 1 for a vehicle is attached to the vehicle body 3.

According to this configuration, the step 7 can be moved in the up-down direction DZ and the vehicle width direction DX by rotating the arm 6. The arm 6 is supported by the base end of the arm 6. The base end of the arm 6 does not move in the vehicle width direction DX. With such a structure, the portion disposed below the vehicle body 3 can be reduced in size in the vehicle width direction DX and the up-down direction DZ.

(2) In the above step apparatus 1 for a vehicle, the arm 6 is inclined downward toward the outer side DE of the vehicle width direction in the deployed state.

According to this configuration, the step 7 can be disposed at a position lower than the base end of the arm 6 in the deployed state.

(3) In the step 7, the support surface 76a supported by the arm 6 is orthogonal to the second rotation axis CB. According to this configuration, the step 7 can be smoothly moved.

(4) In the base 4, a portion supporting the arm 6 has a portion orthogonal to the first rotation axis CA. According to this configuration, since a force applied to the arm 6 can be received by the portion orthogonal to the first rotation axis CA, deformation of the base 4 can be reduced.

(5) In the step apparatus 1 for a vehicle, the position of the step 7 in the stowed state is higher than the position of the step 7 in the deployed state.

According to this configuration, the step 7 can be stowed at the position higher than the position of the step 7 in the deployed state.

(6) In the step apparatus 1 for a vehicle, the base end of the arm 6 is located above a lower end of the step 7 in the stowed state.

According to this configuration, it is possible to smoothly move the step 7 when the step apparatus 1 for a vehicle shifts from the stowed state to the deployed state.

(7) In the step apparatus 1 for a vehicle, the step 7 contacts with a lower portion of the base 4 in the stowed state.

When there is a gap above the step 7, the step 7 vibrates up and down, and a load is applied to the arm 6. In this regard, according to this configuration, the up-down vibration of the step 7 is limited, and the load applied to the arm 6 during the vibration can be reduced.

(8) In the step apparatus 1 for a vehicle, at least one of the base 4 and the step 7 includes the contact portion 70. In the stowed state, the contact portion 70 is configured to contact with one of the base 4 and the step 7, which is different from the other one provided with the contact portion 70.

When the step 7 does not contact with any portion of the base 4, the step 7 may contact with the base 4 due to vibration, and abnormal noise may be generated. In contrast, according to the above configuration, since the step 7 and the base 4 contacts with each other, the generation of such abnormal noise can be prevented. The contact portion 70 may be provided on the step 7, may be provided on the base main body 5, or may be provided on the bracket 10.

OTHER EMBODIMENTS

The above embodiment is not limited to the examples of the above configuration. The above embodiment may be modified as follows. In the following modification, components that are substantially the same as the components of the above embodiment are denoted by the same reference numerals as those of the components of the above embodiment and described.

In the present embodiment, the shaft body 52 of the first shaft portion 24 is fixed to the base 4. The arm 6 rotates with respect to the shaft body 52. In contrast, the shaft body 52 of the first shaft portion 24 may be fixed to the arm 6. In this case, the base 4 is provided with a bearing that receives the shaft body 52.

In the present embodiment, the first pin 81 and the second pin 82 of the second shaft portion 25 are fixed to the attachment portion 75 of the step 7. The arm 6 rotates with respect to the first pin 81, and the second pin 82. In contrast, instead of the first pin 81 and the second pin 82, a shaft body may be fixed to the arm 6. In this case, the attachment portion 75 of the step 7 is provided with a bearing that receives the shaft body.

An installation position of the second shaft portion 25 provided on the step 7 is not limited. For example, the second shaft portion 25 may be provided on the step 7 so as to protrude from a side surface of the step 7 toward the inner side DI of the vehicle width direction.

Figure 14:
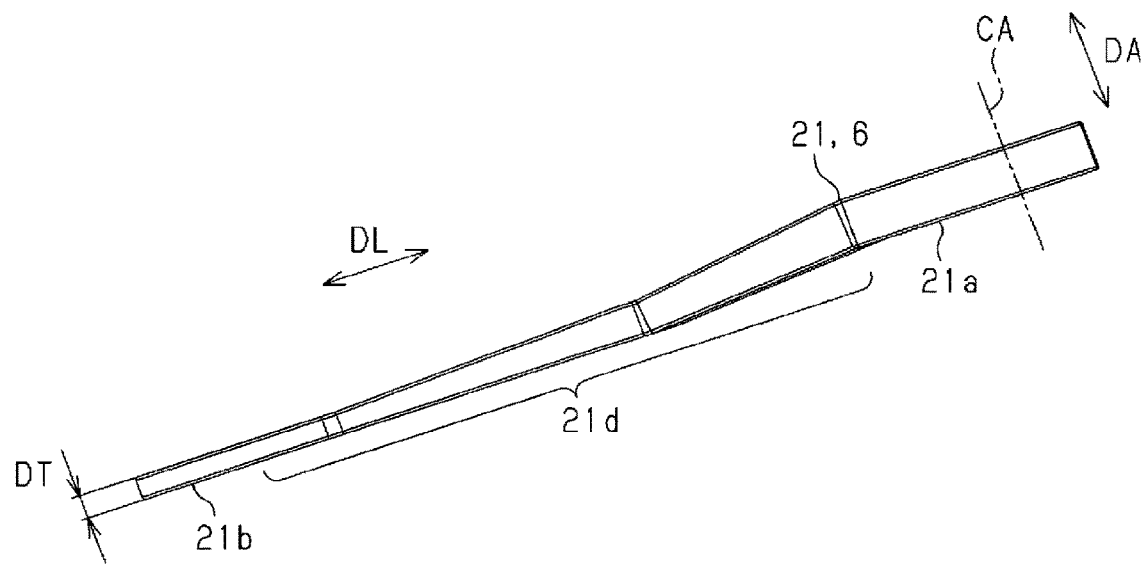
FIG. 14 is a rear view of a modification of the arm.

As shown in FIG. 14, a thickness DT of the arm 6 may be set as follows. The thickness DT of the arm 6 in a direction DA along the first rotation axis CA gradually decreases toward the tip end of the arm 6 in a longitudinal direction DL of the arm 6. In one example, the thickness DT of the arm 6 in the direction DA along the first rotation axis CA gradually decreases toward the tip end of the arm 6 in a range of at least a part of the arm 6 in the longitudinal direction DL.

An example of the first arm 21 having such a structure will be described. FIG. 14 is a rear view obtained by viewing a modification of the first arm 21 from a rear side in the deployed state. In this example, in the longitudinal direction DL of the first arm 21, the thickness DT of the first arm 21 gradually decreases toward the tip end 21b of the first arm 21 in an intermediate range 21d excluding the base end 21a and the tip end 21b of the first arm 21. The tip end of the arm is thinner than that of the following reference arm. The reference arm has the same length as that of the first arm 21, has a uniform thickness DT along the longitudinal direction DL, and has the same bending strength as that of the first arm 21.

According to the arm 6 having such a configuration, it is possible to reduce a thickness of the tip end of the arm 6 while limiting a decrease in the bending strength of the arm 6. Since the thickness of the tip end of the arm 6 can be reduced, the thickness of the step 7 at a portion supported by the tip end of the arm 6 can be reduced.

The invention claimed is:

1. A step apparatus for a vehicle comprising:
   a base attached to an outer side of a vehicle body;
   an arm rotatably provided on the base; and a step supported by the arm and movable with respect to the base, wherein the step apparatus for a vehicle is in, by rotation of the arm, a deployed state in which the step is to be used or a stowed state in which the step is stowed under the vehicle body, a first rotation axis of a base end of the arm and a second rotation axis of a tip end of the arm are inclined upward toward an outer side of a vehicle width direction in an attached state in which the step apparatus for a vehicle is attached to the vehicle body, the step includes an attachment portion to which a tip of the arm is rotatably attached, the attachment portion includes a second shaft portion to which the tip of the arm is attached, the attachment portion includes a support surface supported by the arm, the support surface intersects with the second rotation axis of the second shaft portion, and the attachment portion and the second shaft portion are below an upper surface of the step.

2. The step apparatus for a vehicle according to claim 1, wherein a thickness of the arm in a direction along the first rotation axis gradually decreases toward the tip end of the arm in a longitudinal direction of the arm.

3. The step apparatus for a vehicle according to claim 1, wherein in the deployed state, the arm is inclined downward toward the outer side of the vehicle width direction.

4. The step apparatus for a vehicle according to claim 1, wherein a support surface supported by the arm in the step is orthogonal to the second rotation axis.

5. The step apparatus for a vehicle according to claim 1, wherein in the base, a portion that supports the arm has a portion orthogonal to the first rotation axis.

6. The step apparatus for a vehicle according to claim 1, wherein a position of the step in the stowed state is higher than a position of the step in the deployed state.

7. The step apparatus for a vehicle according to claim 1, wherein in the stowed state, the base end of the arm is located above a lower end of the step.

8. The step apparatus for a vehicle according to claim 1, wherein in the stowed state, the step contacts with a lower portion of the base.

9. The step apparatus for a vehicle according to claim 1, wherein at least one of the base and the step includes a contact portion, and in the stowed state, the contact portion is configured to contact with one of the base and the step, which is different from the other one provided with the contact portion.

\* \* \* \* \*